United States Patent [19]

Hoang et al.

[11] Patent Number: 5,509,539
[45] Date of Patent: Apr. 23, 1996

[54] METHOD FOR PREPARING INJECTION MOLDING COMPOUND PELLETS TO REMOVE MOLDING COMPOUND DUST AND BROKEN PELLETS

[75] Inventors: Troung Hoang, Sacramento; James Vitale, Jr., Loomis; James Chinn, Sacramento; Gary Kobashigawa, Fair Oaks; Ion Dobre; Avelard Crisostomo, both of North Highlands, all of Calif.

[73] Assignee: NEC Electronics Incorporated, Mountain View, Calif.

[21] Appl. No.: 171,142

[22] Filed: Dec. 21, 1993

[51] Int. Cl.[6] ............................................. B07C 5/04
[52] U.S. Cl. ..................... 209/634; 134/21; 134/25.1; 134/25.4; 134/25.5; 134/37; 209/300; 209/305; 15/303; 15/305
[58] Field of Search .................. 134/21, 25.1, 25.4, 134/37; 34/403, 406; 209/300, 305, 634; 15/303, 305

[56] References Cited

U.S. PATENT DOCUMENTS

| | | | |
|---|---|---|---|
| 1,807,891 | 6/1931 | Bottorff | 209/305 X |
| 3,041,212 | 6/1962 | Booth | 134/21 |
| 3,341,011 | 9/1967 | Prescott | 209/305 X |
| 3,341,365 | 9/1967 | Berz | 134/25 |
| 3,592,689 | 7/1971 | Chaplinski | 134/1 |
| 3,809,575 | 5/1974 | Yeo | 134/21 |
| 4,314,856 | 2/1982 | Steimel | 134/25.4 |
| 4,699,710 | 10/1987 | Williams | 209/24 |

FOREIGN PATENT DOCUMENTS 1917269  10/1969  Germany .

*Primary Examiner*—David L. Lacey
*Assistant Examiner*—Sean Vincent
*Attorney, Agent, or Firm*—Skjerven, Morrill, MacPherson, Franklin & Friel; Ken John Koestner

[57] ABSTRACT

An injection molding compound pellet cleaner 10 removes broken pellets and eliminates excessive dust from molding compound pellets for preparation of the pellets for processing in an automatic molding machine. The pellet cleaner includes a vacuum chamber 22 and a perforated canister 50 for holding the pellets 80. A vacuum is generated within the chamber to clean dust from the pellets and to remove broken pellets.

7 Claims, 7 Drawing Sheets

METHOD FOR PREPARING INJECTION MOLDING COMPOUND PELLETS TO REMOVE MOLDING COMPOUND DUST AND BROKEN PELLETS

BACKGROUND OF THE INVENTION

1. Field of the Invention

The present invention relates to a method and apparatus for preparing injection molding compound pellets for use and, more particularly, to a method and apparatus for cleaning pellets and separating out broken pellets prior to use in an automatic molding machine.

2. Description of the Related Art

Injection molding, which includes extremely high pressure processes used for article molding, as well as transfer molding used in semiconductor processing, is a commonly used manufacturing process. Traditionally, this process has been a manual operation in which a machine operator handles a manual molding press. This press is manipulated to inject a raw plastic pellet/tablet into the veins and cavities of a die set which is a template image of the end product. The operator causes injection by allowing a plunger, powered by a hydraulic ram, to compress the compound through a cylinder into the cavities of a die set at high temperature and pressure. The high temperature and pressure conditions allow the compound to flow into the cavities of the die set where the compound is later cooled and released as an end product. This manual molding press requires the operator to place pellets into the machine and operate the hydraulic ram for each machine cycle to make the end product.

More recently, automated molding equipment has been introduced into manufacturing. Using this equipment, the operator does not need to manually place the pellets into the machine and operate the press during each cycle. The most automated of this equipment only requires that the operator place a batch of the compound, usually in a pellet form, into a hopper. This hopper transfers the molten pellet material into a molding die set which automatically forms each batch of end product through a sequence of mechanical steps which is typically controlled by a computer. This automatic operation, however, is not free from problems.

Two types of reliability problems are inherent to automated molding machines that process compound pellets. First, automated molding machines commonly utilize automatic pellet loading equipment that uses sensors to detect the presence of pellets as it cycles them through the molding machine. Automated molding machines frequently jam when broken pellets are introduced into the loading area. These pellets are commonly broken during shipping or handling. They end up in the pellet hopper because of the operator's failure to remove them. Abnormal pellets cause the machine to jam because the automatic pellet loading equipment uses sensors, such as pattern detectors, that have difficulty detecting pellets of an abnormal shape or size.

A second type of problems arise in automated molding machines due to the use of sensors for detecting positioning of automated assemblies within the machine. The automated molding machines use electronic sensors such as electronic eyes to detect the positioning of these various assemblies. If the electronic sensors fail to detect the positioning of an assembly within the machine, the machine generally enters a failure mode, stopping its operation and causing jamming. Sensors become blocked or fouled with mold compound dust that originates from the mold compound pellets.

Reliability problems in these two areas cause a significant degradation of the manufacturing process because they usually result in substantial equipment stoppages or jamming that ultimately reduces equipment utilization and depresses productivity. What is sought is a method and apparatus that will substantially decrease the occurrence of stoppages on these machines. The previous method of operation, depicted in FIG. 1, requires an operator to perform a sequence of manual steps to clean and sort pellets before they used in an automatic molding machine. In a first step 100 involving manual handling of the pellets, the operator moves pellets 80 from their shipping box 82 and loads them into a sorting box 84. In a second step requiring manual handling of the pellets, the operator visually inspects the pellets in the sorting box 84 to remove broken pellets and excessive dust. Then the operator uses a scoop 86 to transfer the pellets from the box 84 into the machine hopper 88 in a third step 104 in which the pellets are handled. This hopper transfers the pellets into the automatic molding machine.

With the advent of costly automated molding injection machines, the minimization of molding machine downtime is of increased performance. The condition of the molding compound pellets that are fed into the machines is critical for productive use of the machines. Automated molding injection machines having automatic loaders require that the pellets be geometrically true and free from excessive dust. What is desired is a reliable, rapid, easy to operate and inexpensive apparatus and method for separating out broken pellets. What is also sought is a reliable, rapid, easy to operate and inexpensive apparatus and method that removes excessive dust from the pellets. By removing geometrically bad pellets and excessive dust from the pellets, the propensity of the automated molding injection machines to jam at the automatic loader is greatly reduced. In addition, reducing the amount of dust from the pellets helps to avoid machine failures caused by dusty sensors such as robotic electronic eyes in mechanical feed assemblies.

SUMMARY

Advantages of the present invention include the reliable, rapid, easy to operate and inexpensive removal of broken pellets and excessive dust from molding compound pellets. Broken pellets and excessive dust exist where the pellets are taken out of their shipping box. Removing the broken pellets and excessive dust from the molding compound pellets before they are placed into the machine reduces the frequency of occurrence of machine stoppages that afflicts automated molding machines.

Advantageously, the present invention reduces the incidence of manual handling of the pellets, thereby decreasing the probability of damaging pellets during the handling process.

These and other advances are achieved in the present invention, which in one embodiment is an apparatus for preparing molding compound pellets for use in a molding machine. The apparatus includes a vacuum chamber with an airflow inlet port and an airflow outlet port providing a connection to a vacuum source. The apparatus also includes a container for holding multiple pellets which has a holding wall and an entry opening for receiving the pellets. Multiple openings are distributed in the entry wall. The apparatus also includes a container support for positioning the container within the vacuum chamber.

Another embodiment of the invention is a method for processing molding compound pellets for use in a molding machine. This method includes the step of placing the pellets into a container through a first opening. The container has a wall portion with several smaller openings of a size and shape to prevent whole pellets from passing through. A second step of the method is to provide a source of ambient air at the first opening and introduce a vacuum at the container wall portion so that the ambient air at the first opening is drawn into the container and then out of the container through the second openings to entrain broken pellets and compound dust.

BRIEF DESCRIPTION OF THE DRAWINGS

The present invention is better understood and its advantages, objects and features better made apparent by reference to the following description, in conjunction with the accompanying drawings, in which.

DETAILED DESCRIPTION OF THE PREFERRED EMBODIMENT

Figure 2:
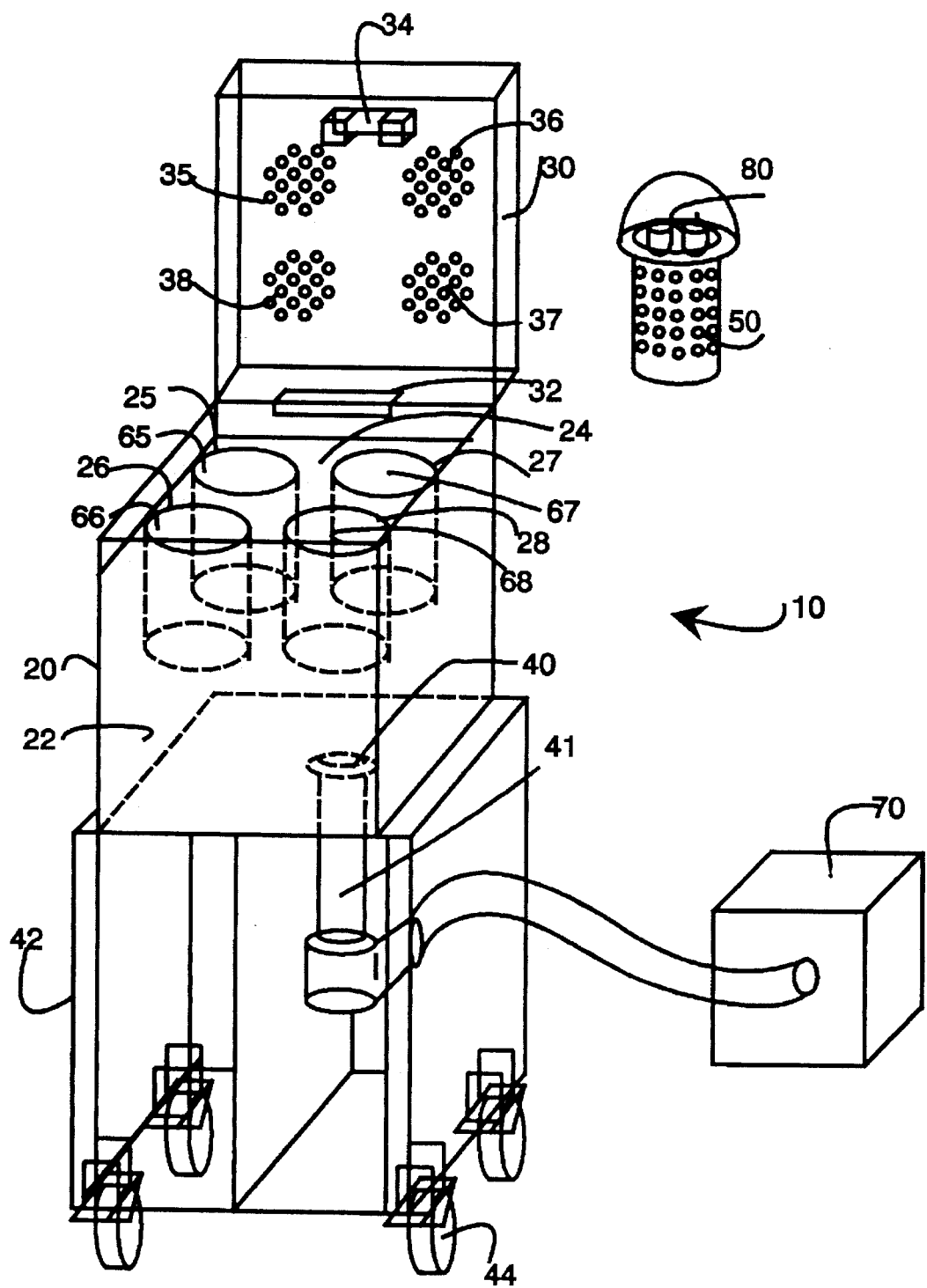
FIG. 2 is a three-dimensional pictorial view illustrating an injection molding compound pellet cleaner.
Figure 3:
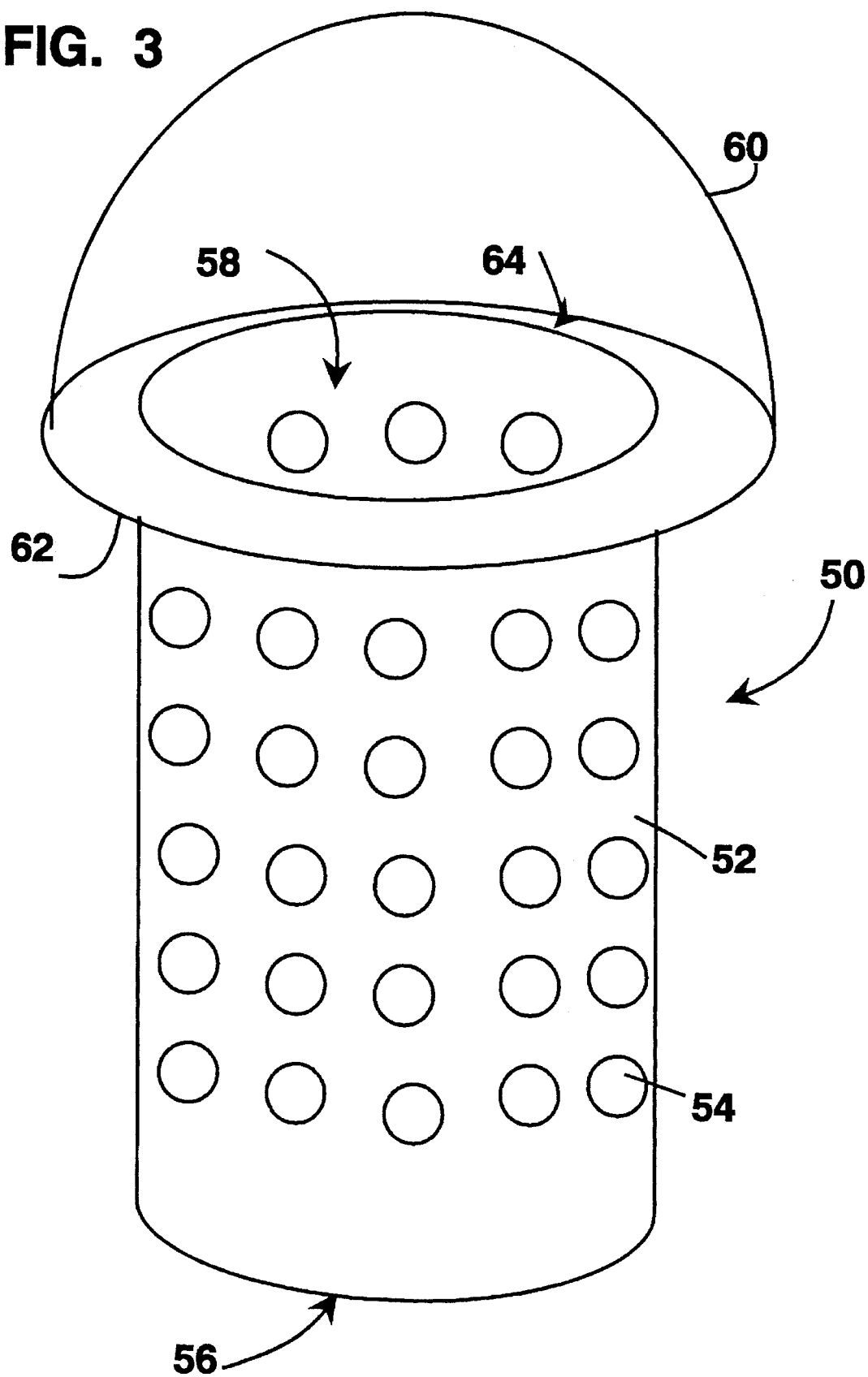
FIGS. 3, 4 and 5, respectively are a three-dimensional perspective view, a side plan view and a top plan view of a perforated canister used by the injection molding compound pellet cleaner.
Figure 4:
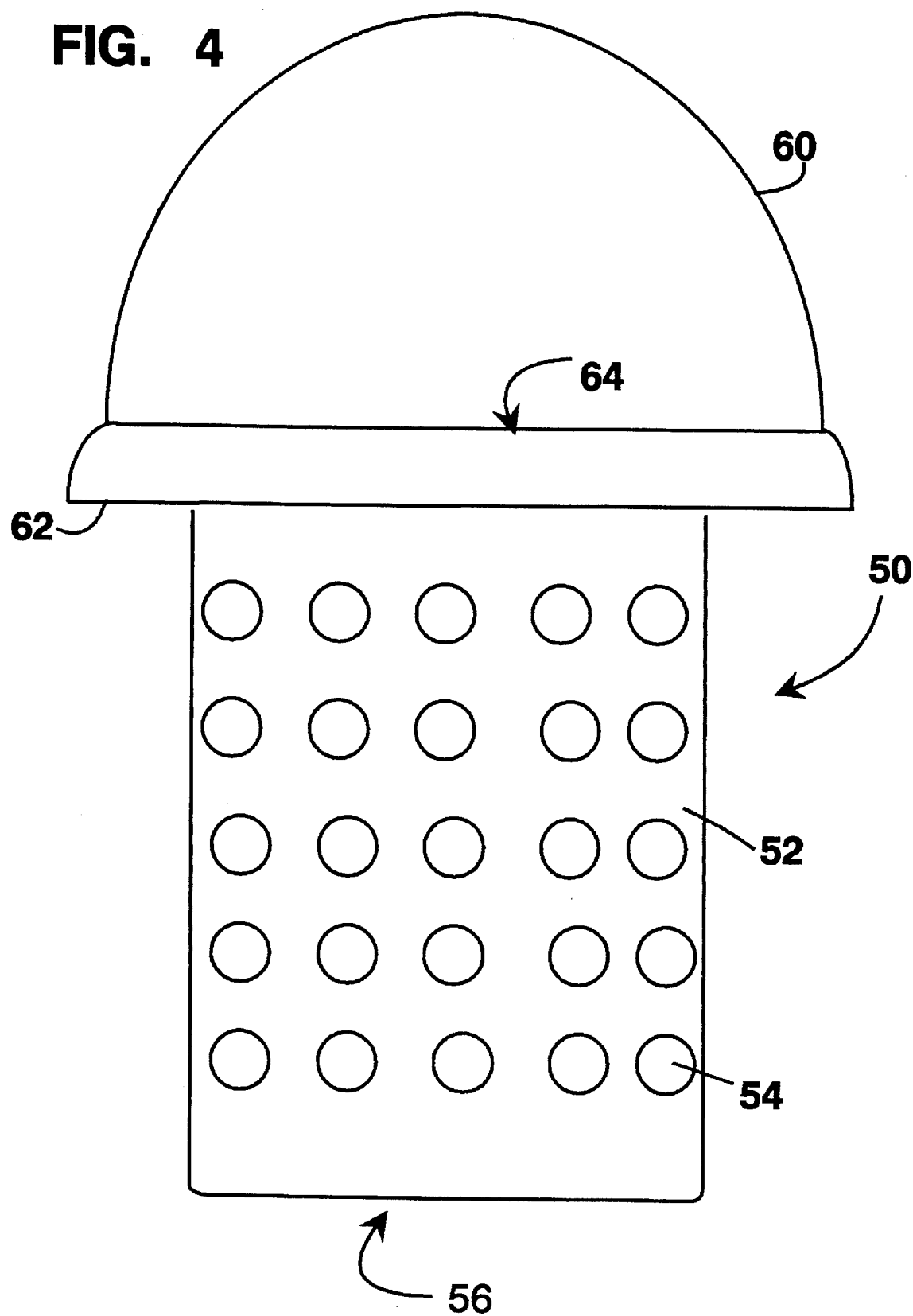
Figure 5:
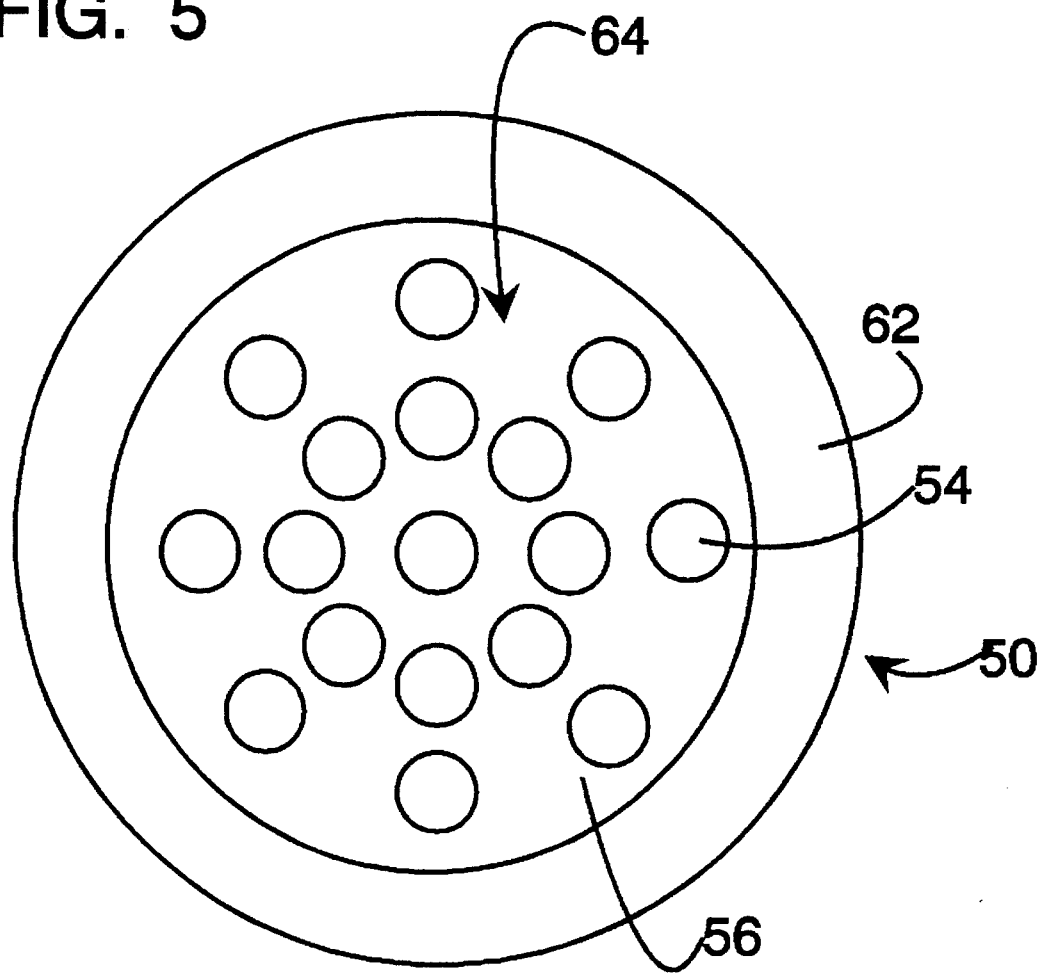

Referring to FIG. 2, there is shown an injection molding compound pellet cleaner 10 including a vacuum box 20 enclosing a vacuum chamber 22, a vacuum pump 70 for applying a vacuum to the chamber and creating an airflow path, and a perforated container or canister 50. Only one canister 50 is shown in FIG. 2 for simplicity. The vacuum box 20 has airflow inlet ports 35, 36, 37 and 38 and an airflow outlet port 40, forming an air flow through the vacuum chamber 22 from the inlet ports to the outlet port.

The vacuum box 20 includes a canister support 24, an interior structure that is disposed within the vacuum chamber 22 for supporting several canisters, such as the canister 50. Canister apertures 65, 66, 67 and 68, slots for holding canisters like canister 50, are provided in the canister support 24. The canister apertures are essentially circular apertures of a size selected to receive the circular dimension of the cylindrical canister 50. At the edge of the apertures 65, 66, 67 and 68 are canister aperture support rims 25, 26, 27 and 28 for supporting rims of the canisters like canister 50. Alternatively, canisters like the canister 50 may be supported by, for example, hooks, support wires, scaffolding, shelves, or the bottom surface of the vacuum box.

The vacuum box 20 includes a vacuum box lid 30, which is connected to the vacuum box by a hinge 32 so that the lid can be opened or securely closed by an operator using a lid handle 34. Through the lid 30 are provided the several airflow inlet openings 35, 36, 37 and 38, which are circularly distributed in a position opposite, adjacent, and in alignment with the canister apertures 25, 26, 27 and 28 in the canister support 24.

The airflow outlet port 40 is located generally in the vicinity of the vacuum box 20 opposing the lid 30. The airflow outlet port 40 is coupled to a vacuum suction tube 41, an elongated tubular member, that is interposed between the vacuum box 20 and the vacuum pump 70. The vacuum pump 70, or other suitable vacuum generator, is connected by any suitable hose with the airflow output port 40 through a vacuum conduit 41. The injection molding compound pellet cleaner 10 further includes a base 42 and wheels 44 to provide portability to multiple automatic molding machines.

Referring in conjunction with FIG. 2 to FIGS. 3, 4 and 5, respectively a three-dimensional perspective view, a side plan view and a top plan view of an illustrative perforated canister 50 is shown that is positionable within the vacuum box 20. The canister 50 is an upright hollow canister cylinder having an open end 64, a circular bottom endwall 56 and a cylindrical sidewall 52. Positioned throughout the canister cylindrical sidewall 52 and the canister circular bottom endwall 56 are numerous canister perforations 54. The canister perforations 54 have a size that is selected to be smaller than the diameter of the circular dimension of the injection molding compound pellets 80 to be cleaned. At the open end 64 of the canister 50 is a flange 62 extending radially outward from the cylindrical sidewall 52. The flange 62 is provided for resting on one of the canister aperture support rims 25, 26, 27 and 28, when the canister 50 is inserted through one of the apertures 65, 66, 67 and 68 within the vacuum box 20. The canister 50 has a canister cavity 58 for holding multiple pellets 80 and a canister handle 60 for handling the canister 50 during transfer to the cleaner 10 and from the cleaner 10 to an automatic molding machine hopper (not shown). The size of the canister cavity 58 is selected to contain a sufficient number of pellets to load the automatic molding machine compound hopper.

Figure 6:
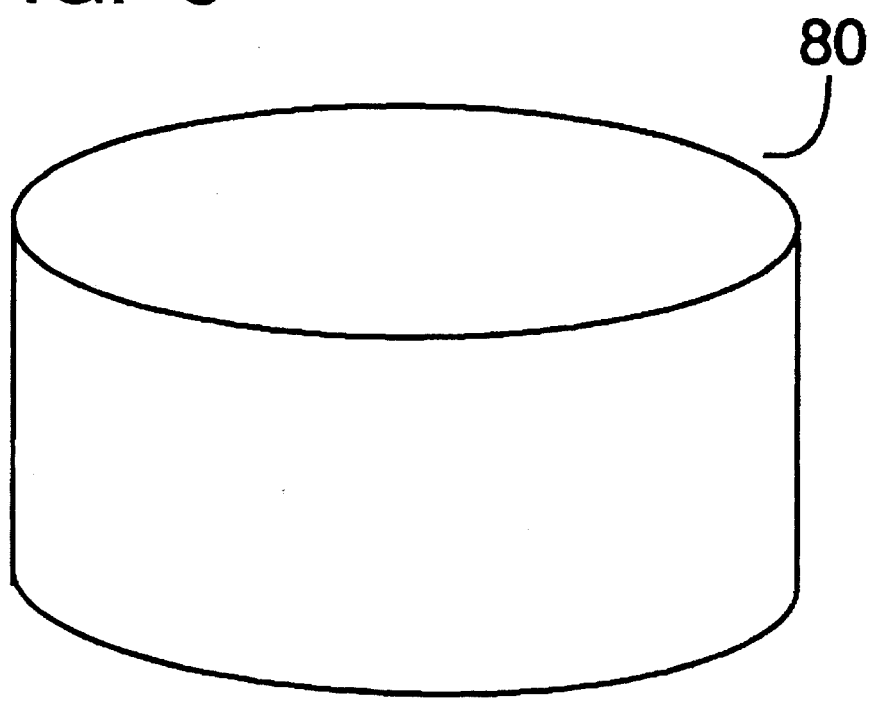
FIG. 6 is a pictorial view of an injection molding compound pellet.

FIG. 6 depicts an exemplary injection molding compound pellet 80, which is in the form of a solid cylinder. Injection molding compound pellets are available in various sizes. For the injection molding compound pellet cleaner 10 to effectively remove broken pellets, pellets specified to be of a particular uniform size are placed into a canister 50 having perforations 54 which are smaller, for example by ten to fifty percent, than the diameter of the circular dimension specified for the uniformly-sized pellets. If broken pellets are included among the whole pellets in the cleaner 10, application of a vacuum force to the pellets in the canister causes many of the smaller broken pieces to be drawn through the perforations 54.

Figure 7:
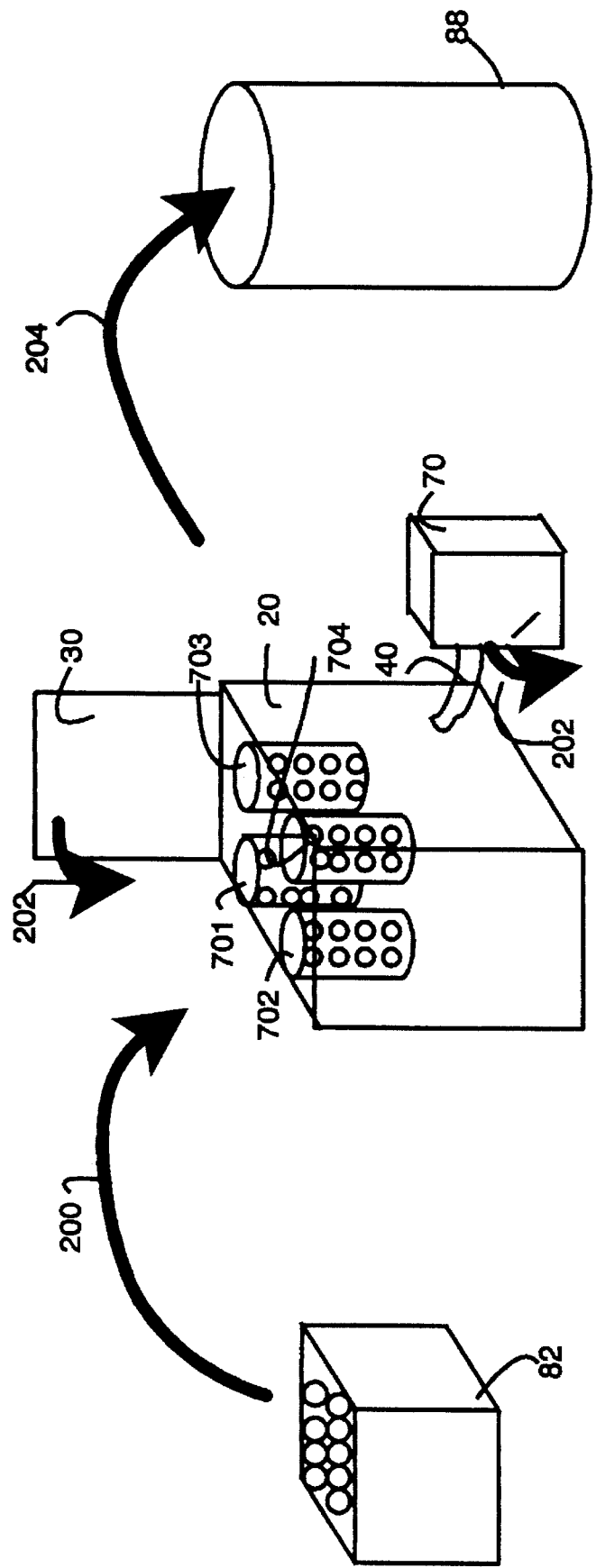
FIG. 7 is a diagrammatic representation of an improved method for preparing injection molding compound pellets for use in an automatic molding machine.

The disclosed apparatus and method simplify the handling, cleaning and sorting process in the manner illustrated in FIG. 7. In a first step 200 of manually handling the pellets, the operator removes the pellets from their shipping box 82 and places them into four perforated canisters 70, 702, 703 and 704, each like canister 50. The pellets may include broken pellets and often the pellets will be coated with excessive molding compound dust when they are removed the shipping box.

The canisters 701, 702, 703 and 704 containing the molding pellets are then placed into, respectively, the canister apertures 65, 66, 67 and 68 located in the vacuum box 20.

The operator then cleans the pellets in a second step, that does not involve manual handling of the pellets. The operator closes the lid 30 on the vacuum box 20, as shown by arrow 202, and applies the vacuum pump 70 to the airflow output port 40 of the vacuum box. As the vacuum 70 is applied to the vacuum box 20, external air enters the vacuum box 20 through the airflow inlet openings 35, 36, 37 and 38, flows through canisters 701, 702, 703 and 704 and the pellets contained therein, removing dust and broken pellets. The vacuum is applied until the mold dust and most of the broken pellets are removed. Commonly, the vacuum is applied for approximately one minute. After this time, the pellets are generally free from excessive dust and broken pellets. Broken pellets migrate through the canister and drop through one of the perforations loaded at the periphery of the canister.

After the vacuum is turned off and the lid is opened, the canister contains clean and generally unbroken pellets that are ready for use. The operator removes the canister 50 from the vacuum box and pours its contents into the hopper 88 of the automatic molding compound pellet loader in a second step 204 involving manual handling of the pellets.

Figure 1:
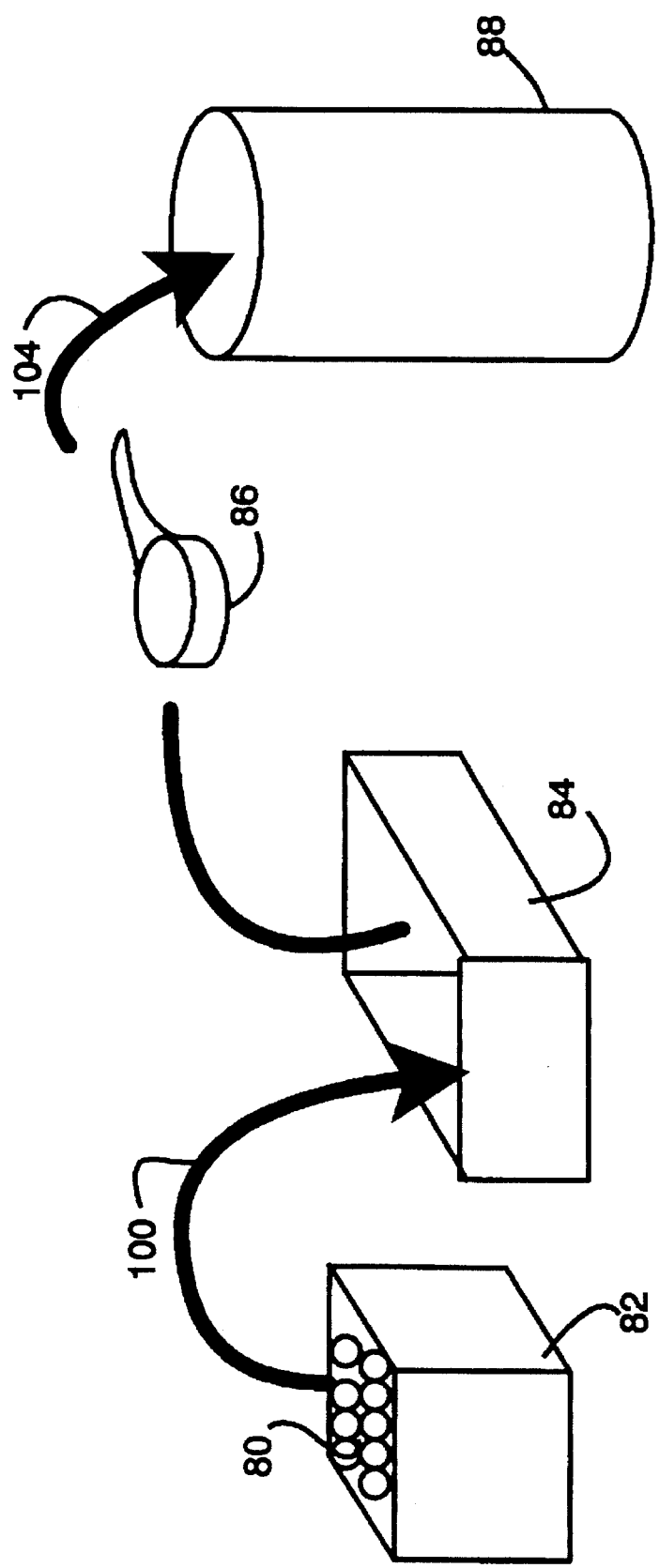
FIG. 1 is a diagrammatic representation of a prior art method for preparing injection molding compound pellets for processing by an automatic molding machine.

The method of preparing pellets for processing by an automatic molding machine depicted in FIG. 7 is advantageous, in comparison to the prior method shown in FIG. 1, for many reasons. The method shown in FIG. 7 is more reliable and rapid for removing dust and broken pellets. The time consuming step of visually inspecting for dust and broken pellets (step 102 of FIG. 1) is very time consuming in a production environment that requires swift and steady delivery of raw materials. The FIG. 7 process is easy to use and is inexpensive to implement. Furthermore, the new method reduces the number of steps in which the molding pellets are manually handled from three transfers to two transfers. This decreases the probability of damaging pellets during the handling processes.

Although the present invention has been described in detail with reference to a particular embodiment, other embodiments are possible which incorporate various vacuum-creating means, support structures and pellet-holding means. Accordingly, the scope of the invention should be determined not by the embodiment illustrated, but by the appended claims and their legal equivalents.

We claim:

1. A method of processing molding compound pellets, to remove molding compound dust and broken pellets, comprising the steps of:

loading a plurality of pellets, which are contaminated by molding compound dust and broken pellets, into a container perforated by a plurality of distributed openings;

transferring the loaded container to a position within a vacuum chamber; and applying a vacuum source to the vacuum chamber to draw air through the vacuum chamber so that molding compound dust and broken pellets are removed from the perforated container through the distributed openings.

2. A method as in claim 1, wherein unbroken pellets are substantially uniform in size and shape, further comprising the step of:

selecting the size of the distributed openings in the container so that the distributed openings are smaller than the largest dimension of the unbroken pellets so that the step of applying the vacuum source causes broken pellets to migrate through the container and out of the container through the distributed openings.

3. A method as in claim 2, wherein the step of selecting the size of the distributed openings in the container includes the step of selecting the sizes of the distribution openings so that the distributed openings are ten to fifty percent smaller than the largest dimension of the pellets.

4. A method of processing molding compound pellets for use in a molding machine to remove molding compound dust and broken pellets, comprising the steps of:

introducing a plurality of pellets including unbroken pellets and contaminating molding compound dust and broken pellets into a container through a first opening in the container, the container having a wall portion which includes a plurality of second openings having a size and shape which impede passage of the unbroken pellets but allow passage of broken pellets and molding compound dust;

introducing a vacuum at the container wall portion so that air is drawn into the container through the first opening and then from the container through the second openings to entrain said broken pellets and said compound dust.

5. A method as in claim 4 further comprising the step of introducing the container into a vacuum chamber, wherein:

the vacuum introducing step comprises the step of evacuating the vacuum chamber.

6. A method of processing molding compound pellets for use in a molding machine to remove molding compound dust and broken pellets comprising the steps of:

introducing the pellets including unbroken pellets, molding compound dust and broken pellets into a container through a first opening therein, the container having a wall portion which includes a plurality of second openings of a size and shape to impede passage of the pellets;

immersing the container into a vacuum chamber, the container being a cylindrical container wherein the first opening is an open end of the cylindrical container and the container wall portion is a flat bottom wall and a perpendicularly intersecting cylindrical sidewall, the openings being perforations distributed in the cylindrical sidewall and in the flat bottom wall; and;

urging the cylindrical container against a lid having a perforated portion of the vacuum chamber so that the open end of the cylindrical container is opposed said a perforated portion of the vacuum chamber lid.

7. A method as in claim 6 further comprising, subsequent to the vacuum introducing step, the steps of;

removing the vacuum at the container wall portion after a predetermined period of time; and removing the container from the vacuum chamber.

* * * * *

UNITED STATES PATENT AND TRADEMARK OFFICE
CERTIFICATE OF CORRECTION

PATENT NO. : 5,509,539
DATED : April 23, 1996
INVENTOR(S) : Truong Hoang, James Vital Jr., James Chinn, Gary Kobashigawa, Ion Dobre and Crisostomo It is certified that error appears in the above-indentified patent and that said Letters Patent is hereby corrected as shown below:

ON THE TITLE PAGE
Under item [75] Inventor:
delete "Troung" and insert --Truong--

Signed and Sealed this

Third Day of September, 1996

Attest:

BRUCE LEHMAN

Attesting Officer     Commissioner of Patents and Trademarks